March 12, 1940.  K. K. PROBST  2,193,431
POWER TRANSMISSION MECHANISM
Original Filed June 18, 1934   4 Sheets-Sheet 3

INVENTOR
Karl K. Probst
BY Braselton, Whitcomb & Davies
ATTORNEYS

March 12, 1940.　　　K. K. PROBST　　　2,193,431

POWER TRANSMISSION MECHANISM

Original Filed June 18, 1934　　4 Sheets-Sheet 4

INVENTOR
Karl K. Probst
BY
Braselton, Whitcomb & Davies
ATTORNEYS

Patented Mar. 12, 1940

2,193,431

UNITED STATES PATENT OFFICE 2,193,431

POWER TRANSMISSION MECHANISM

Karl K. Probst, Detroit, Mich.

Application June 18, 1934, Serial No. 731,030
Renewed December 8, 1937

4 Claims. (Cl. 74—326)

This invention relates to power transmission mechanism, and is more particularly directed to means for changing the driving ratio between a prime mover of a vehicle and the driving wheels.

The invention embraces the provision of means for transmitting power to the driving wheels of the vehicle, wherein simple and efficient means are utilized to change the driving ratio between the power plant and the drive wheels of the vehicle, especially adaptable for use when the vehicle has attained higher speeds to maintain the vehicle speed at substantially reduced engine speed.

The invention comprehends a so-called "overdrive power transmission" wherein a suitable mechanism is associated with the main drive shaft and arranged to be quickly and easily manipulated to render the "overdrive transmission" effective or ineffective.

The invention embraces an overdrive mechanism and particularly a system of gearing and associated parts which are comparatively silent in operation and of such character that the longitudinal thrusts under driving stresses are substantially balanced through the angular relation of associated gears.

A further object of the invention is the provision of a simple and effective gear clutching means associated with a synchronizing member whereby the manipulation of driving ratio change may be quickly and quietly obtained with a minimum of wear on the parts.

A further object of the invention resides in the provision of a mechanism of this character adapted to be associated with the driving axle or differential of an automotive vehicle.

A still further object of the invention is the provision of a drive of this character having simple and effective control means for changing the driving ratio easily and effectively irrespective of the speed at which the mechanism is operating.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which.

This invention is particularly adapted for use in connection with a driving mechanism of an automotive vehicle, especially those vehicles powered by internal combustion wherein the power factors vary with the speed of the engine for the purpose of establishing an over drive or change in the ratio of speed between the prime mover or engine and the drive wheels of the vehicle so that a comparatively high vehicle speeds, the engine speed may be reduced to a more efficient operating speed yet maintaining the vehicle speed. It is to be understood that the arrangement of the mechanism of the invention may be utilized in any power transmitting mechanism where the same may be found to have utility.

Figure 1:
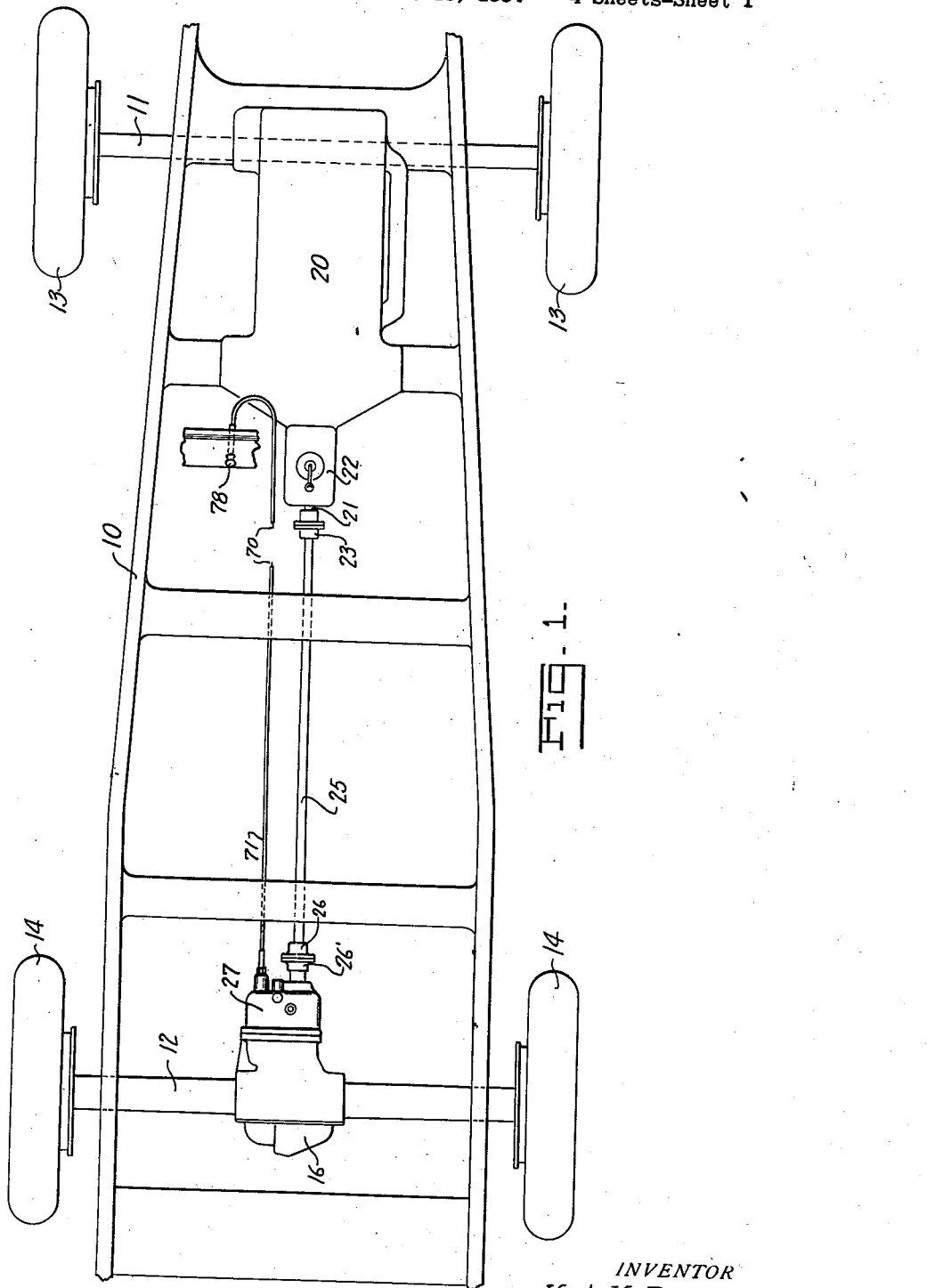
Figure 1 is a top plan view of a typical chassis of an automotive vehicle showing a form of the invention incorporated therein.

Referring to the drawings in detail and particularly Figure 1 thereof, an automotive vehicle chassis is illustrated, inclusive of a frame structure 10, a forward axle or wheel support 11, and a rear axle or member enclosing driving mechanism, and 13 and 14 the associated sets of vehicle wheels. The wheels 14, in the embodiment illustrated, are the driving wheels of the vehicle being suitably connected through the mechanism contained in member 12 to a differential gear mechanism enclosed within a suitable housing 16. A prime mover or engine 20 which may be of the internal combustion type is mounted on or carried by the frame 10 and has a speed change transmission or gear set associated therewith positioned within a housing 22 preferably located amidship of the vehicle chassis.

Extending rearwardly from the transmission housing 22 is a stub shaft 21 and connected thereto by means of a flexible coupling or universal joint arrangement 23 is a propeller or main drive shaft 25, which shaft is connected by a second universal joint to the overdrive mechanism of my invention positioned within a housing 27 which is preferably mounted adjacent the differential housing 16.

Figure 2:
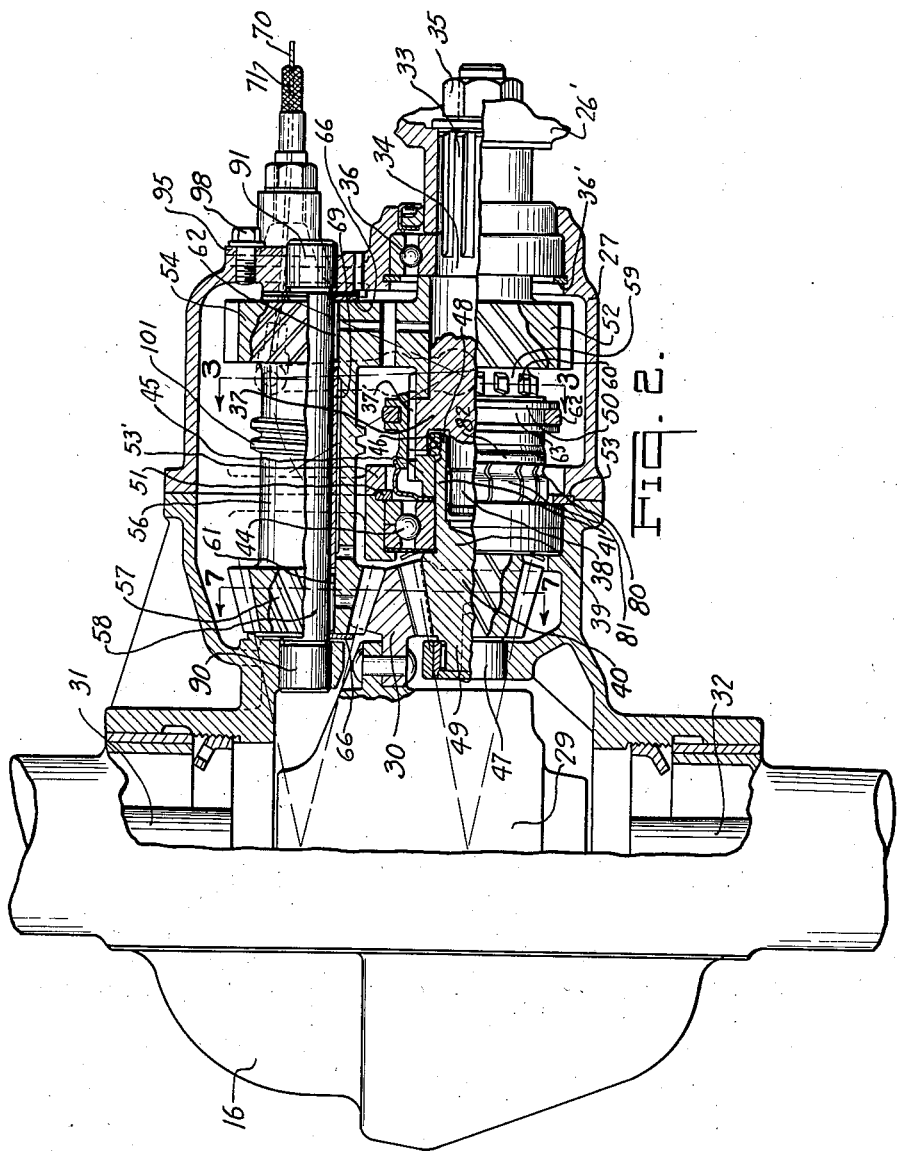
Figure 2 is a sectional detailed view illustrating a form of "overdrive mechanism" of my invention.

As illustrated in Figure 2, the housing 16 encloses a ring gear 30 mounted in driving relation with respect to the drive wheels through the medium of differential mechanism contained within casing 29 and drive axles 31 and 32, or other suitable means.

In the arrangement of my invention the propeller shaft 25 is connected through a universal joint 26, one portion of the joint 26' being fixedly secured to an extending spline portion 33 of a shaft 34, portion 26' being held in place by means of a nut 35. The shaft 34 is journalled for rotation within the housing 27 upon suitable anti-friction bearings such as the ball bearing arrangement 36 being held in place in the housing by means of a snapring 36'. The portion of shaft 34 extending within the housing 27 is formed or provided with an enlarged portion 37 having spaced clutch teeth 37' and a reduced extremity 38. The portion 38 of shaft 34 is preferably received within a hollow extension 41 of a pinion shaft 39 formed with a driving pinion 40, the shaft being suitably journalled for rotation upon an anti-friction bearing 44 preferably of the ball type. Upon the end of pinion shaft 39 is suitably positioned a toothed clutch collar 45 keyed or otherwise secured to the shaft for rotation therewith, and is held in place by an internally threaded ring 46 engageable with the threaded portion 48 of the extension 41. The anti-friction bearing 44, preferably of the ball type, is positioned in the housing 27 by means of a split ring 51 carried within an annular groove 53 formed in an integral web like portion 53' of the housing 27. The teeth of pinion 40 are in constant mesh with the teeth of the ring gear 30 and the pinion is supported with respect thereto by means of needle bearing 47 carried by a boss portion formed integral with the housing 27, the bearing engaging a reduced extension 49 of the pinion shaft 39.

In order to drive the pinion at the same speed as the main drive shaft 35, I have provided a movable clutch member or collar 50 of annular configuration which is internally grooved or slotted for sliding engagement with the teeth on portion 37 of the shaft 34 and the toothed collar 45 mounted upon the pinion shaft 39. Thus, when the movable clutch element 50 is in the position illustrated in Figure 2, a driving connection is established between the shaft 34, pinion shaft 39, and the pinion 40 formed thereon and the ring gear 30 is in direct driving relation with respect to the propeller or main drive shaft 25.

In order to maintain the speed of the ring gear 30 and thus the drive axles 31 and 32 and at the same time reduce the engine speed, I have provided a second driving arrangement or "overdrive". This arrangement includes a gear 52 having spiral or helical teeth journalled for rotation on shaft 34. The gear 52 is in constant mesh with a gear 54 carried by a sleeve or member 56 mounted in parallel axial relation with respect to the shaft 34. Sleeve 56 also carries at its other end a pinion gear 57 adapted for constant enmeshment with the ring gear 30. The sleeve 56 and gears 54 and 57 in the embodiment illustrated are of integral construction, however, the sleeve and gears may be separate units connected together. The sleeve 56 is suitably journalled upon an auxiliary shaft 58 and supported directly upon anti-friction needle bearings 61 and 62 which are separated by means of a bushing or collar 69.

By means such as washers or shims 66 at each end of the gears 54 and 57, the needle bearing elements are maintained in proper position with respect to the sleeve 56, the shims also serving to properly position the sleeve and gears longitudinally. The gears 52 and 54 are preferably of the helical spur tooth type to reduce gear noise to a minimum. Gear 52 is provided with a radially toothed extension 59, the dogs or teeth 60 being adapted for slidable enmeshment with the splines or grooves in the movable clutch collar 50. By this arrangement, the clutch collar 50 may be moved to the right, as viewed in Figure 2, and shaft 34 be connected to and will drive the gear 52 and thus gear 54 and pinion 57. By such driving arrangement through the difference in ratio of the teeth on gears 52 and 54, it will be noted that the ring gear 30 will be driven at a correspondingly higher speed while the shaft 34 is being driven at a comparatively low speed and by varying the sizes of the gears 52 and 54, any desired ratio may be obtained. Further change in speed may be obtained by changing the size and number of teeth in the pinion 57 and ring gear 30.

Figure 3:
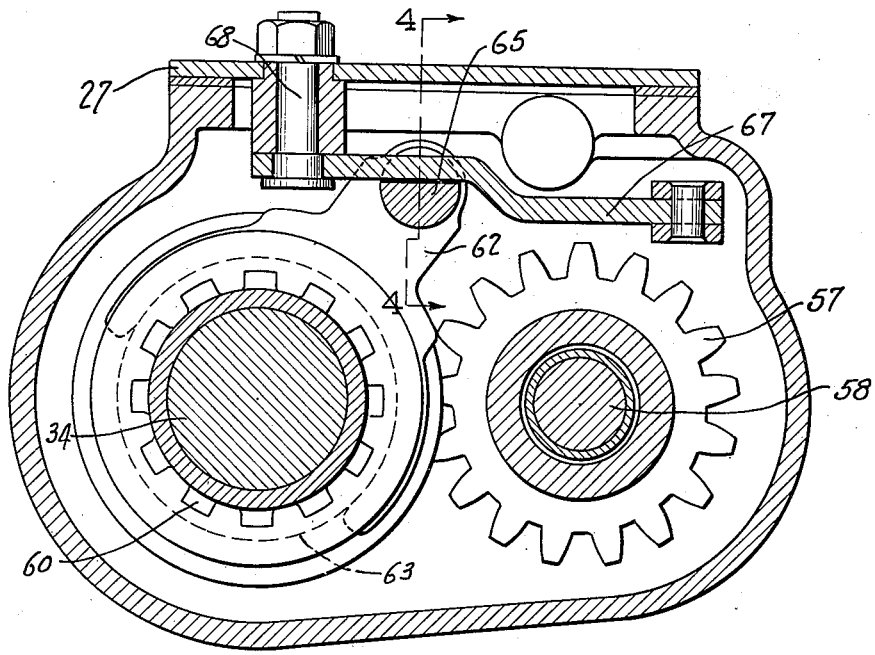
Figure 3 is a detail sectional view taken substantially on the line 3—3 of Figure 2.
Figure 4:
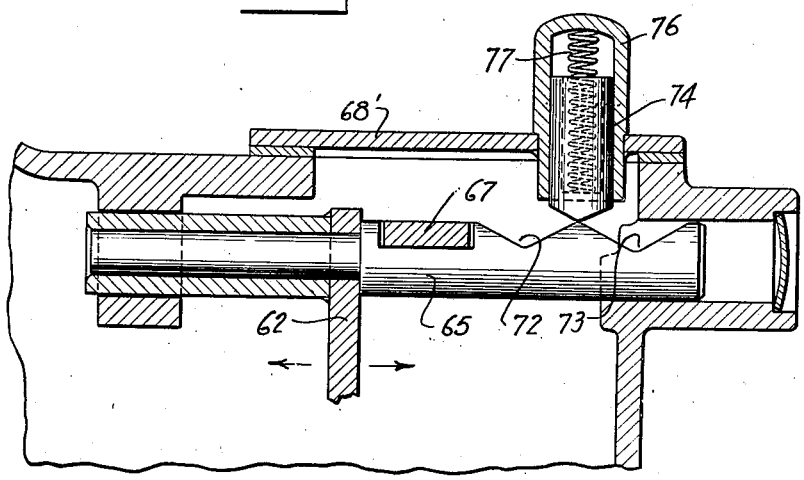
Figure 4 is a vertical sectional detail view taken substantially on the line 4—4 of Figure 3.

Suitable means may be provided for shifting the clutch collar 50 and I preferably use a yoke member 62 engageable with a grooved portion 63 of the collar 50, the yoke 62 being secured to a longitudinally slidable operating rod 65 as particularly illustrated in Figures 3 and 4. The operating rod 65 is preferably actuated by means of a lever 67 pivotally supported by the housing 27 through a pivot or pin connection 69. To the other end of the lever 67 is connected an operating means as for example a flexible cable or wire 70. The operating wire or cable 70 is enclosed by suitable shield or guiding sheath 71 which is fixedly connected to a wall of the housing 27 and extends to a position convenient to the operator of the vehicle, such as the dashboard or instrument panel, an operating button 78 or other suitable actuating means being secured to the other end of wire 70.

Means are provided to insure either positive direct drive or positive overdrive and in the form illustrated this means is associated with the operating rod 65. To this end the rod 65 is notched as at 72 and 73 to alternately receive the extremity of a spring pressed finger or pawl 74 mounted for sliding movement within a cup 76 carried by the cover plate 68.

The spring 77 is positioned between the pawl 74 and the bottom of the cup to urge the pawl into engagement with the rod 65. I have also provided a gear synchronizing means facilitating the shifting of the clutch member comprising a cup-shaped member 80 splined or otherwise secured to the pinion shaft 39, the open end of which is engageable with an extended portion 82 of the clutch collar 50 when the latter is shifted to the left as illustrated in Figure 2. The member 80 is integrally formed with a plurality of resilient fingers 81, and when the clutch collar 50 is moved toward enmeshing position with the toothed member 45, the resilient fingers 81 first engage with clutch collar 50 and frictionally bring the collar and driving pinion 40 to substantially the same or synchronized speed prior to enmeshment of the clutch teeth so that smooth engagement is attained without "tooth clash". At the same time, the pawl 74 has begun its entrance into the notch 73 and the pressure of spring 77 aids in completing the engagement of the toothed clutches, and a positive driving connection is maintained between the main drive shaft 34 and the pinion 40 until such time as the operator of the vehicle shifts the clutch collar 50 into engagement with the toothed clutch portion of the gear 52 to the overdrive gearing into effective use. When the overdrive is being used the pawl 74 is in engagement with the notch 72 in the rod 65 and a driving connection is thus established between drive shaft 34, gear 52, and through pinion 57 and ring gear to the drive axles.

In the arrangement of my invention I have substantially eliminated longitudinal thrusts which would ordinarily be transmitted to the member carrying the overdrive gearing and this elimination of thrusts is accomplished by utilizing helical teeth upon gear 54 cut on an angle opposite to the angularity of the teeth upon the driving pinion 57 so that under load there is substantially no tendency of the sleeve 56 to move endwise. The tooth angles of the gear 54 and driving pinion 57 may not be the same due to the fact that the pinion is formed with spiral bevel teeth while the gear 54 is provided with helical spur teeth, but the angles are preferably of such degree as to substantially offset endwise movement or thrusts when load is being transmitted through this gearing. For example, I have found that a tooth having a 35° spiral angle for the pinion construction 57 substantially balances the end thrusts when used with a gear 54 having a helical angle of 40° for the teeth thereof, although other combinations of gears having different tooth angles will accomplish substantially the same results.

Figure 5:
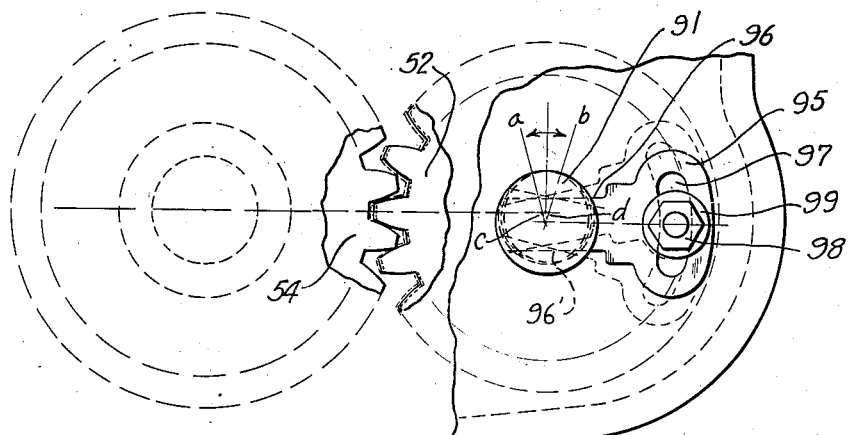
Figure 5 is a fragmentary detailed view showing the arrangement of adjusting certain elements of my invention.
Figure 6:
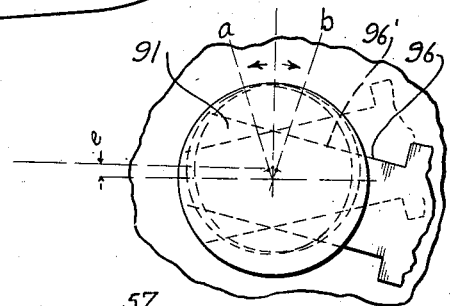
Figure 6 is an enlarged fragmentary view illustrating the method and arrangement of adjustment of mechanism shown in Figure 5.
Figure 7:
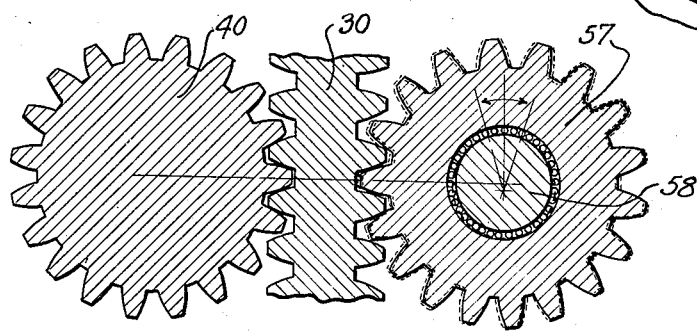
Figure 7 is a sectional detail view taken substantially on the line 7—7 of Figure 2.
Figure 8:
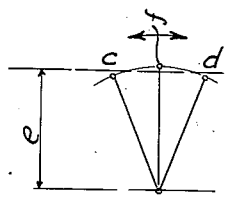
Figure 8 is a diagrammatic illustration showing the degree of adjustability and the directional factors affecting the mechanism.

The arrangement of my invention embodies a feature of adjustability which I have found makes readily possible and practicable the commercial production in large quantities of the "overdrive" mechanism yet a high degree of accuracy in manufacture of certain of the elements of the arrangement need not be maintained in order to insure a smooth running and noiseless "overdrive" arrangement. To this end I have provided a means whereby the shaft or spindle 58 supporting the overdrive pinion 57 and spiral gear 54 is movable or adjustable laterally with respect to the axis of the main drive shaft so that the pinion 57 may be easily and quickly moved into proper enmeshment with the teeth of the ring gear 30. To this end, the enlarged extremities 90 and 91 of the auxiliary shaft 58 are eccentrically arranged with respect to an axis of the intermediate or main portion of the auxiliary shaft, this eccentricity being particularly exemplified in Figures 5 and 6 of the drawings. The included angle between the lines a and b in Figures 5, 6 and 8 represents the practical limits of lateral eccentric movement of the shaft 58 to secure the desired adjustability of the pinion with respect to the ring gear as illustrated in Figure 7, the range of the actual lateral movement of the pinion being between points c and d as illustrated on Figures 5 and 8. The rotation of the eccentrically mounted shaft 58 in the embodiment of my invention illustrated in Figures 5 and 6 is accomplished by means of a sheet metal bracket 95 having a tenon 96 which projects into a slot 96' adjacent an extremity of the portion 91 of the auxiliary shaft.

The bracket 95 is formed with an arcuate slot 97 which cooperates with a cap screw 98 and washer 99 illustrated in Figures 2 and 5 which may be manipulated to fixedly secure bracket 95 in adjusted position. The range of adjustment of bracket 95 and consequent radial or lateral movement of the counter shaft with respect to the axis of the shaft 37 is indicated by dotted lines 5 and 6, and the corresponding range of adjustment of the enmeshing teeth of the spur gear 54 and pinion 57 being indicated in dotted lines in Figures 5 and 7. It is to be noted that the axis of the auxiliary shaft is above the center of the eccentric portions 90 and 91 a distance indicated at e in Figures 6 and 8, this dimension e being substantially midway between the central or uppermost position of the shaft as indicated at f in Figure 8 and the lowermost extreme adjusted positions c and d of center of the shaft. By this method of arranging the eccentricities of the tenons on the auxiliary shaft with respect to the principal axis of the shaft 58, the lateral adjustment with respect to the main drive shaft which is in the direction indicated by the arrow in Figure 8 is many times the corresponding degree of movement of the eccentrically mounted auxiliary shaft in a direction at substantially right angles to a plane passing through the axes of the main and auxiliary shafts.

Thus, by this system of adjustment, the lateral movement of the spur gear 54 and pinion 57 is sufficient to obtain a wide range of adjustment to take care of any inaccuracies of manufacture, yet the vertical movement of the axis of the spur gear and pinion is so small as to have no appreciable effect upon the proper enmeshment of the gears. Moreover, this amount of vertical movement of the gears is not sufficient in practical application of the invention to cause the gears to become noisy in operation.

The auxiliary shaft 58 is provided with a speedometer driving gear 101 which is connected by suitable well known means to an odometer and speed indicating means of usual construction. By placing the speedometer gear on the auxiliary shaft the speedometer and odometer will register accurately the rate of speed and distances traveled as the inclusion of the overdrive gearing will not effect any change in ratio to the speedometer operating mechanism.

It is apparent that, within the scope of the invention, modifications and different arrangements may be made other than is herein disclosed, and the present disclosure is illustrative merely, the invention comprehending all variations thereof.

What I claim is:

1. Power transmission mechanism comprising a drive axle; a main drive shaft; a double toothed ring gear connected to said drive axle; a pinion meshing with one set of teeth of said ring gear arranged in axial alignment with said main drive shaft; a spindle arranged substantially parallel to said main drive shaft, a sleeve journalled on said spindle; a helical gear journalled for rotation on said main shaft; a second helical gear associated with said sleeve and meshing with said first mentioned helical gear; a second pinion associated with said sleeve and in mesh with another set of teeth on said ring gear; and means whereby drive to said axle may be alternately established through either of said pinions.

2. Power transmission mechanism comprising a drive axle; a main drive shaft; a double toothed ring gear connected to said drive axle; a pinion meshing with one set of teeth of said ring gear arranged in axial alignment with said main drive shaft; a spindle arranged substantially parallel to said main drive shaft, a sleeve journalled on said spindle; a helical gear journalled for rotation on said main shaft; a second helical gear associated with said sleeve and meshing with said first mentioned helical gear; a second pinion associated with said sleeve and in mesh with another set of teeth on said ring gear; means whereby drive to said axle may be alternately established through either of said pinions; and means for shifting said spindle laterally with respect to said main drive shaft whereby the pinion associated with said sleeve may be adjusted with respect to said ring gear.

3. A power transmission mechanism comprising a drive axle; a main drive shaft; a double toothed ring gear connected to said drive axle; a pinion meshing with one set of teeth of said ring gear; a spindle arranged substantially parallel to the axis of said pinion; a sleeve journalled on said spindle; helical gearing connecting said main drive shaft with said sleeve whereby the latter may be driven from the main drive shaft; a second pinion associated with said sleeve and in mesh with another set of teeth on said ring gear; and means whereby a drive to said axle may be alternately established through either of said pinions.

4. In combination, a vehicle drive axle; a double toothed ring gear connected thereto; a main drive shaft; a spindle arranged in substantially parallel relation to said main drive shaft; driving pinions cooperatively associated with said main shaft and said spindle and in constant mesh with the teeth of said ring gear; a pair of helical toothed gears in constant mesh and carried respectively by said main shaft and said spindle for changing the ratio of speed of said driving pinions; means for selectively connecting said main shaft directly to one of said pinions or through said helical gearing to the other of said pinions; and means for shifting said spindle laterally with respect to said main drive shaft whereby the pinion associated with said spindle may be adjusted with respect to said ring gear, said spindle adjusting means including a key; a slot in said key; and means cooperating with said slot for retaining the spindle in adjusted position.

KARL K. PROBST.